United States Patent
Tang

(12) 
(10) Patent No.: US 6,741,042 B1
(45) Date of Patent: May 25, 2004

(54) LIGHT-EMITTING DEVICE FOR OPTIC FIBER DECORATION

(76) Inventor: Tai-Ning Tang, 581 Kamoku St., #3506, Honolulu, HI (US) 96826

(*) Notice: Subject to any disclaimer, the term of this patent is extended or adjusted under 35 U.S.C. 154(b) by 0 days.

(21) Appl. No.: 10/314,956

(22) Filed: Dec. 10, 2002

(51) Int. Cl.[7] .................................................. G05F 1/00
(52) U.S. Cl. ........................ 315/291; 362/559; 40/547
(58) Field of Search ................................. 315/291, 307, 315/311; 362/555, 565, 227, 800, 276, 554, 556, 559, 812; 40/581, 547

(56) References Cited

U.S. PATENT DOCUMENTS

| | | | | |
|---|---|---|---|---|
| 4,264,845 A | * | 4/1981 | Bednarz | 315/323 |
| 4,383,244 A | * | 5/1983 | Knauff | 340/321 |
| 5,685,637 A | * | 11/1997 | Chapman et al. | 362/263 |
| 6,416,800 B1 | * | 7/2002 | Weber et al. | 426/104 |
| 2002/0110002 A1 | * | 8/2002 | Nelson | 362/567 |
| 2003/0142510 A1 | * | 7/2003 | Yougzhong | 362/570 |

* cited by examiner

*Primary Examiner*—Don Wong
*Assistant Examiner*—Thuy Vinh Tran
(74) *Attorney, Agent, or Firm*—Rabin & Berdo, P.C.

(57) ABSTRACT

A light emitting device for optic fiber decoration, includes a flash control IC, a plurality of different colored LED's, a variable resistor and a light-sensitive resistor, driven by 4.5V DC voltage to control the flash control IC, with output from the flash control IC controlling each LED to alternatively and gradually change flashing lights. Each LED projects lights into optic fibers, producing romantic light changes in the optic fiber decoration. The invention can be used to replace the light-emitting device, including light bulbs, a motor, color discs and such sophisticated structures in a conventional optic fiber decoration, and provides safer use, more energy saving and higher efficiency than conventional types.

11 Claims, 4 Drawing Sheets

LIGHT-EMITTING DEVICE FOR OPTIC FIBER DECORATION

BACKGROUND OF THE INVENTION (a) Field of the Invention

A light-emitting device for optic fiber decoration, particularly a decoration (such as an angle, a Christmas tree, etc.) made mainly of optic fibers, projecting light into the optic fibers and out of the end of openings of the optic fibers. The invention comprises a flash control IC, a plurality of LED's, a variable resistor, and a light-sensitive resistor, driven by a 4.5 DC baby unit. The low 4.5V DC voltage activates the flash control IC. The output from the flash control IC controls each LED to produce gradually changing and flashing lights of different colors alternatively flashing on and off through optic fibers in various configurations (such as the wings of an angel, the outline of a Christmas tree, etc.), designed to replace conventional light-emitting mechanism with such features as safe use, energy saving and enhanced efficiency.

(b) Description of the Prior Art

The light-emitting device of a conventional optic fiber decoration consists of a motor, transmission gear set, color discs, and light bulbs; the motor is driven by a battery unit (or a voltage converter) to transit motion to the gear set at a reduced speed and rotate the color discs slowly, so that the lights from the light bulbs are projected through the color discs (the discs are made of transparent materials, and have color sectors with different colors and patterns) and into the optic fibers. The lights then come out of the ends of the optic fibers to display colorful lights and color tones in gradual changing phases. Such optic fiber decorative products are suitable for festivals or special occasions (such as a Christmas tree, an angel, an animal a landscape scale, etc.) because of their beautiful color changes and alternatively flashing lights to enrich the atmosphere. The conventional light emitting device, however, consists of numerous components including a motor, a transmission gear set, color discs and light bulbs, which involve difficulties in the assembling process. Furthermore, mechanical transmission consumes much power energy. In case it is battery-driven, the use would often have to pay additional cost for replacing the battery. Moreover, mechanical transmission involves high wear and tear, high trouble rate, and high heat generated by the motor and light bulbs which may burn out or even burn the decoration (many decorative articles contain combustible materials, such as Styrofoam, paper or fabrics) or burn the user. There is much room for improvement.

SUMMARY OF THE INVENTION

In view of the shortcomings in conventional light-emitting devices in optic fiber decorations, the inventor has searched for possible improvement, and based on many years experience in the research and development, and production, has come up with the prevent invention of "light-emitting device for optic fiber decoration" to replace the conventional type of mechanical construction with such characteristics as power saving, safe use, high performance and better variation effects.

For better understanding of the characteristics and technical contents of the present invention, please refer to the following description and drawings.

BRIEF DESCRIPTION OF NUMERALS

| 10 | flash control IC | 50 | circuit board |
|----|------------------|----|---------------|
| 20 | LED | 60 | circuit |
| 30 | variable resistor | 70 | battery unit |
| 40 | light sensitive resistor | 80 | optic fiber |

DETAILED DESCRIPTION OF PREFERRED EMBODIMENTS

Figure 1:
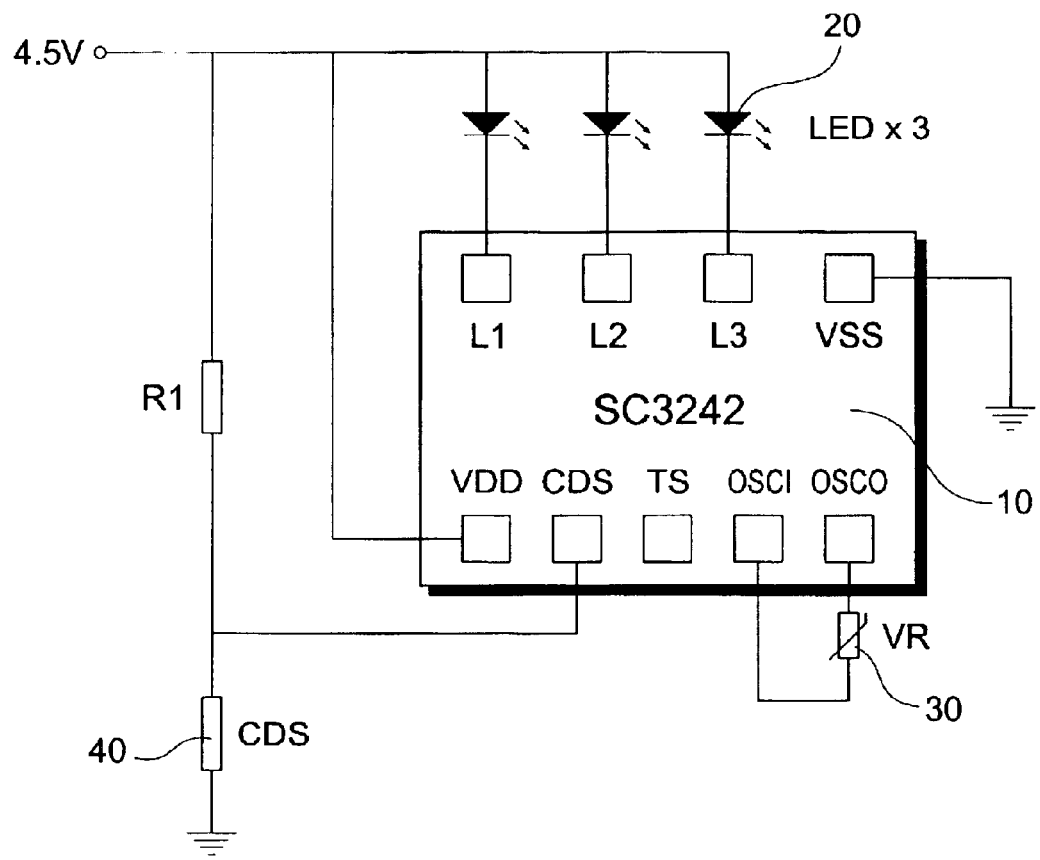
FIG. 1 is a wiring diagram of the present invention.
Figure 2:
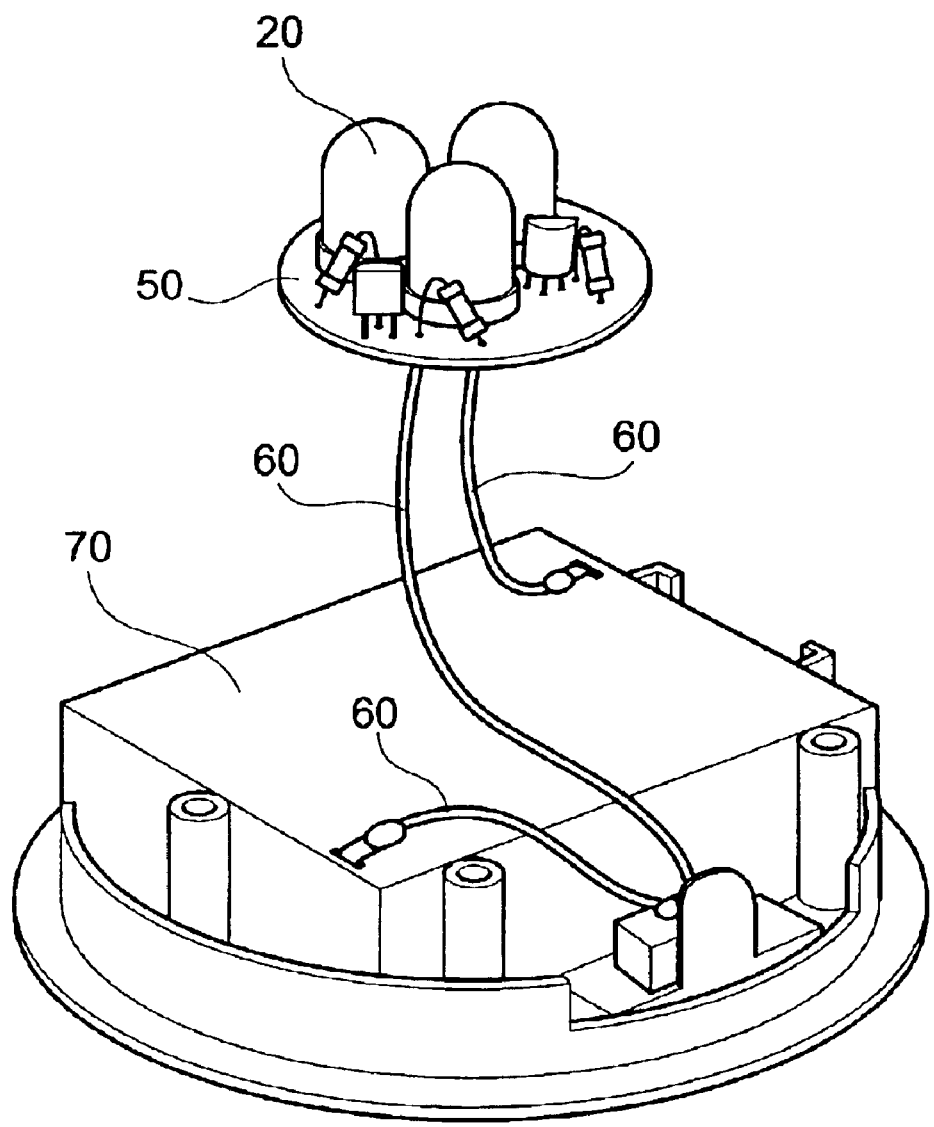
FIG. 2 is a schematic view of the invention.

Please refer to FIGS. 1 and 2, the invention comprises a flash control IC 10, a plurality of different colored LED 20, a variable resistor 30 and a light sensitive resistor 40, driven by a 4.5V DC voltage. The whole structure is installed on a circuit board 50. The circuit board 50 is connected by a wire 60 with a battery unit 70. A 4.5V battery contained inside the battery unit 70 activates the flash control IC 10. Output of the flash control IC 10 controls each LED 20 to produce step-by-step and alternative flashing on and of. Using varied resistances of the variable resistor 30, the invention is capable of changing the output effect of the flash control IC 10, giving respective LED's 20 their variable and beautiful light effects and much fun. Optionally, a light-sensitive resistor 40 is installed to detect changes of ambient light sources and activate or deactivate the flash control IC 10. For instance, this invention installed in a decoration will not function in a well-lit environment (or at daytime). On the other hand, when this invention is placed in a dim or dark environment (or turning from daylight to nighttime), the light-sensitive resistor 40 detects the change of light and automatically activates the flash control IC 10, switching on the LED 20 in the invention.

Figure 3:
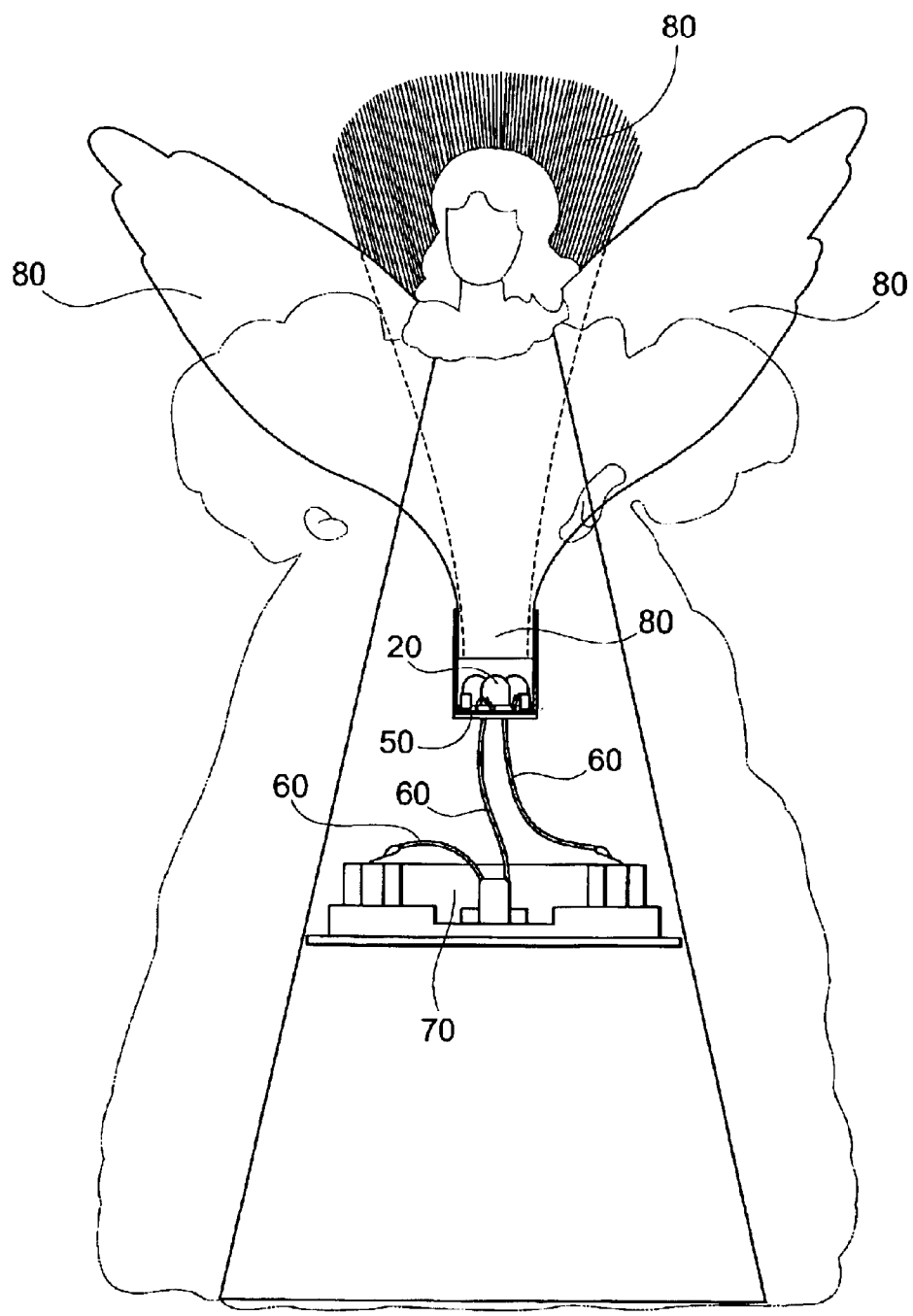
FIG. 3 is an embodiment view of the invention installed inside an optical fiber decoration with an angle figure.
Figure 4:
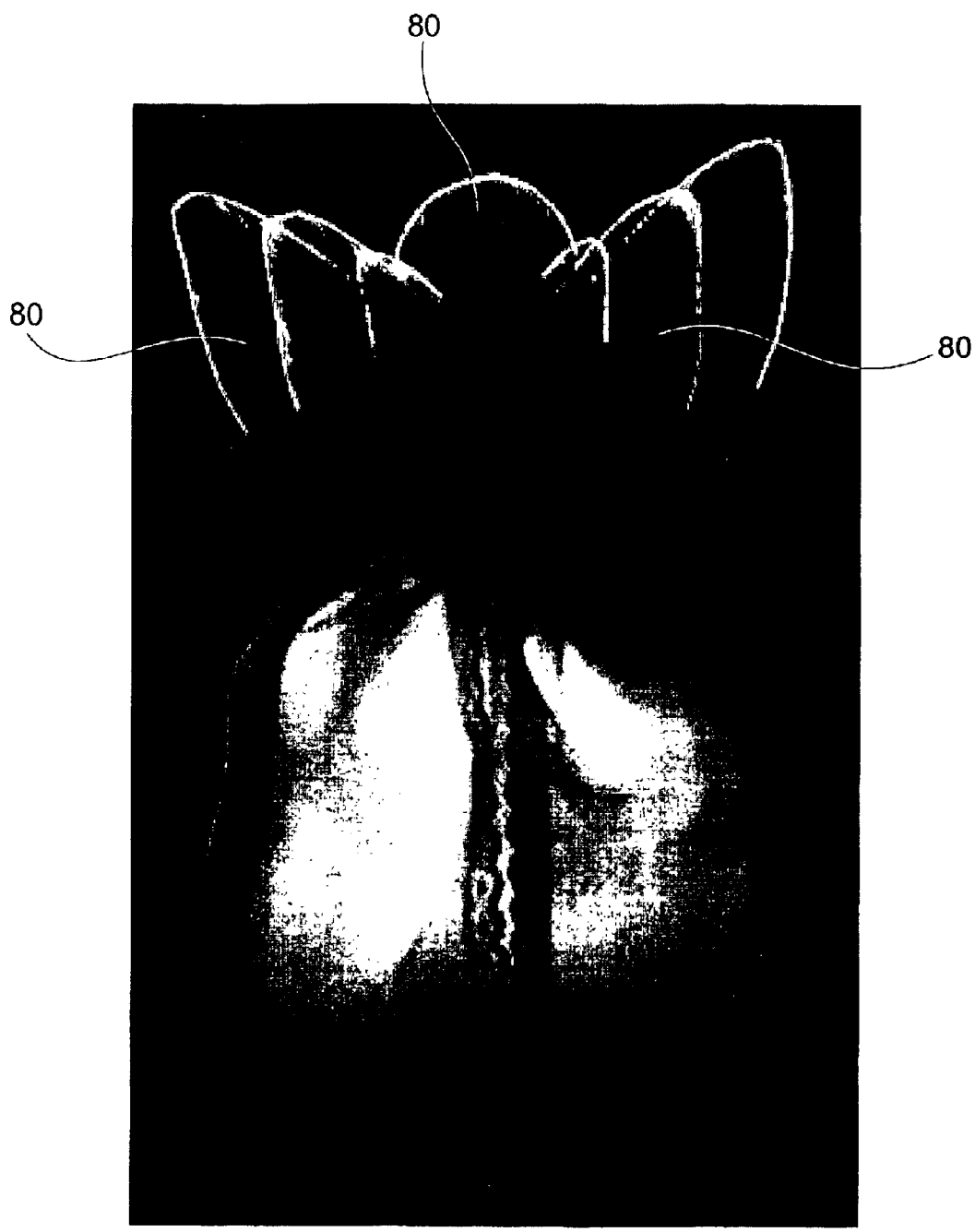
FIG. 4 is an embodiment view of the invention installed in an optical fiber decoration with an angel figure with flashing light effects.

The present invention can be installed inside an optic fiber decoration. As shown in FIG. 3, the invention is installed inside an optic fiber decoration with an angel figure. All LED's 20 of the invention are installed at the bottom of a bundle of optic fibers 80. The flashing light produced from each LED 20 travels into each optic fiber 80 and out of the ends of the optic fiber 80. As shown in the embodiment, the optic fibers make up the wings of the angel, so many gradually changing and flashing lights of different colors produce an excellent psychedelic atmosphere, as shown in FIG. 4.

The entire unit of the invention is an electronic structure, without any mechanical drive or transmission mechanism, characterized in such features as: simplified structural design, compact size, easy assembling (for automated production), no wear and tear after extended use low trouble rate, energy saving, durable and generating no heat, which are all important factors to ensure economic efficiency and safe use.

Summing up, the present invention is a delicately designed electronic structure, with effective improvement on shortcomings of conventional optic fiber decoration devices, such as simplified structural design, compact size easy assembling (for automated production), no wear and tear after extended use, low trouble rate, energy saving, durable, generating no heat, economical and safe, which are all superior and more advanced than similar products.

What is claimed is:

1. A light-emitting device for optic fiber decoration using a plurality of optical fibers having first and second ends, comprising: a flash control IC, a plurality of different colored LED's that are arranged adjacent one another in a group, a and at least one resistor, driven by a power source to control the flash control IC, with output from the flash control IC controlling each LED to alternatively and gradually change flashing lights, and with the first ends of the optical fibers being arranged adjacent one another in a group and located adjacent the group of LEDs, so that the first ends of the optical fibers receive the flashing lights.

2. The device of claim 1, wherein the at least one resistor includes a variable resistor.

3. The device of claim 1, wherein the at least one resistor includes a light-sensitive resistor.

4. The device of claim 1, wherein the at least one resistor includes a variable resistor and a light-sensitive resistor.

5. The device of claim 1, wherein the power source provides a DC potential of about 4.5 volts.

6. The device of claim 1, wherein the power source is a battery.

7. The device of claim 1, wherein the second ends of the optical fibers are disposed in a fanned-out pattern.

8. A decoration, comprising:

a plurality of optical fibers having first and second ends, the first ends being disposed adjacent one another in a first group;

a decorative object to which the optical fibers are attached, with the second ends of the optical fibers being visible from outside the object;

a plurality of different-colored LED's that are arranged adjacent one another in a second group that faces the first group, so that light generated by the LED's enters the first ends of the optical fibers; and means for flashing the LED's.

9. The decoration of claim 8, wherein the means for flashing the LED's comprises a flash control IC, at least one resistor, and a power source.

10. The decoration of claim 8, wherein the second ends of the optical fibers are arranged in at least one fanned-out pattern.

11. The decoration of claim 10, wherein the decorative object comprises a doll.

\* \* \* \* \*